Nov. 2, 1954

R. F. MOLE 2,693,134

HOLE AND SLOT CUTTER

Filed Dec. 18, 1950

INVENTOR.
ROBERT F. MOLE

BY Howard J. Whelan.
ATTORNEY

United States Patent Office 2,693,134
Patented Nov. 2, 1954

2,693,134

HOLE AND SLOT CUTTER

Robert F. Mole, Baltimore, Md.

Application December 18, 1950, Serial No. 201,396

2 Claims. (Cl. 90—12)

This invention relates to cutting machinery and equipment and more particularly to those intended for the making of holes and slots in metal and other rigid materials.

In the making of large holes or openings in metal and other rigid materials, a customary way is to drill a central hole and with the latter as a center rotate a suitable stationary blade, radius or fly cutter at the proper diameter to cut out the material in the form of a plate so it can be removed as a whole and leave the opening. Another way is to scribe off the diameter selected and follow with a drill that will drill a very large number of small holes at the radius line selected until the cut plate is removable in the same manner as that mentioned above. This leaves a large number of semi-circular slots having sharpened points where they arcuately come together, that must be filed off, to make a smooth walled circular hole. In this invention a plate is used which has a series of holes arranged in it to reecive a pivot pin that centers therein. A holder attachable at the chuck that supports a milling cutter, is so adjusted that it will follow around in a circular path of the proper diameter and mill out a slot to cut out the circular plate of excess material, that formerly held the piece where the opening results.

One object of the invention is to provide a new and improved hole cutting device that will avoid some of the disadvantages and limitations of the prior art.

Another object of the invention is to provide a new and improved hole cutting device that will mill out relatively large holes or slots in an efficient and effective manner.

A further object of the invention is to provide a new and improved cutting device that may be readily adjusted to suit the size of hole or slot to be cut, and will involve simple construction while also being economical to operate.

Other objects of the invention will become apparent as the invention is more fully described.

For a better understanding of the invention, reference is made to the accompanying drawings. These drawings in conjunction with the following description illustrate a particular form of the invention by way of example, while the claims emphasize the scope of the invention.

Referring to the drawings.

Figure 5:
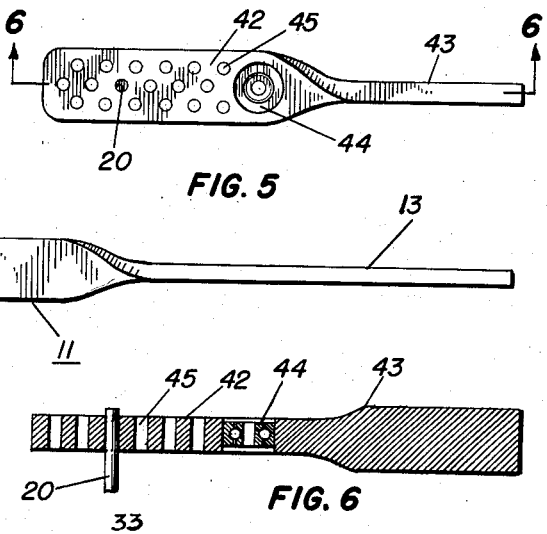
Figure 6:
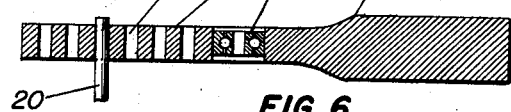
Figure 3:
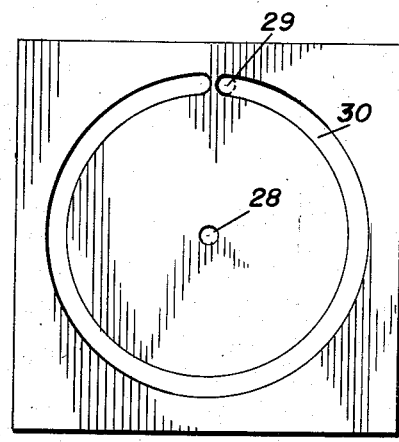
Figure 4:
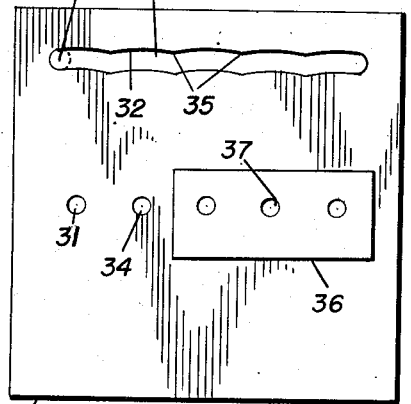

Figure 3 indicates a piece of material with a circular hole in process of being cut therein in accordance with this invention;

Figure 4 is a hole or slot cut rectilinearly in the material by this device;

Figure 5 is a modified view showing an alternate arrangement for reeciving the pivot pin in adjustable relation to the milling cutter; and Figure 6 is a sectional view taken along line 6—6 of Figure 5.

Similar reference numerals pertain to the same parts throughout the drawings.

In the particular construction shown in the drawings, a chuck 10 of conventional form serves as a guidable support for a manually actuated mill manipulator 11. The manipulator comprises a bar 12 from which a handle 13 extends so as to be readily operated at a distance from the chuck. The bar 12 is coupled to the chuck preferably by a bearing member 14 of the ball bearing type, which encompasses a miller tool 15 therein. The bar is attached to the member 14 so it can be adjusted to and from the chuck axis, and by means of pointed teeth 16 on the face of the member 14 meshed with teeth 19 symmetrically disposed in a pin holder 17 to vary the position of the miller in the manipulator.

The pin holder 17 has a slotted opening 18 extended longitudinally across it so that it can be drawn up and tightened on the long cylindrical pin 20. This pin 20 is termed the center or pivot pin and is the basic element about which the device is operated. A locking bolt 21 extends through a bolt hole 22 in the holder 17, crosses a longitudinal slot 23 in the member 14, extends through a hole 24 in the bar 12, and is tightened on the latter by a wingnut 25. The side walls of the member 14 are indexed at 27 in predetermined dimensions to indicate the amount of adjustment made by the member 14 with respect to the holder 17 and its pin 20.

The pin 20 is long enough to extend to a depth approximately equal to that of the operating length of the miller 15. The device is usually employed in the following manner. First a small hole 28 is drilled or punched in the sheet of material 26 that is to have a large circular opening cut in it. The hole 28 is large enough for the pivot pin 20 to fit in closely. The member 14 is adjusted on the holder 17 by means of the setting of the teeth 16 and 19, after which the pivot pin 20 is adjusted to extend approximately out of the clamp and tightened by wing nut 25 on bolt 21. When the member 14 is moved it varies the spacing between the miller 15 and the pivot pin 20. If the distance is increased, the diameter of the opening to be cut out in increased likewise, and vice versa. The miller 15 is run in the diametral drilled hole 29 in the material to start with and then under rotative pressure carried along against its sides of the hole by the handle 13 in a circular path, so that a circular slot is cut out completely. This is due to the rotation and swinging of the miller as it cuts out the material in an arcuate path and follows the pattern of operation well known to those skilled in the art. If the miller leaves a small piece in the slot in the process of its work and near the end of its cutting travel such item of material can be removed with a file or the like. The device can be employed for milling out a slot 30 of rectangular outline. It does not do this accurately but does do it with a sufficient degree of finish to provide a slot that is usable for rough work, or for fine work where a limited amount of filing and finishing can be included after the milled work is completed. Thus for instance, the slot 30 in Figure 4 is cut out by the miller using the hole 31 as a pivot hole. From this position the miller 15 cuts a segment of a circle of large radius with border lines 32 and 33 of arcuate form. The device is then moved to the next hole 34 which is used as a pivot hole for the pin 20, and the miller is put into operation for cutting out a second segment next to and joining the first, so the slot is continued for a like amount. This is repeated until the length of slot required is made. When completed, the device is removed and the tits 35 of material are removed to make the borders of the slot 30 straight. This arrangement enables the work to be done with a milling tool and saves considerable time over other conventional methods. It is not necessary to drill holes 31 and 34 in the sheet of material to be slotted, as it has been found that this slotting work can be done quicker and better by employing a plate 36 that can be attached to the material by clamps or magnetic attraction. The plate is drilled with pivot holes 37 spaced appropriately apart and used as a basis for the pivot pin 20 to operate from. The miller does its work and is shifted from one hole to another across the plate 36 until the slot is cut.

The device is operated by the user by exerting pressure on its handle 13 laterally. It is placed on the chuck and miller so as to guide them without interfering with their regular operation in any manner. The bearing member 14 is preferably arranged so its bearings make actual contact with the chuck or the miller during its use in a frictionless way and to avoid binding on the miller or beaking it. The machine or motor carrying the chuck is preferably of the portable type and is held by the operator in the usual manner. The device is simple in construction and can be made quite light. It requires no bolts or other attachments to apply it to the machine, and it has all the necessary elements for adjusting the drilling and milling to suit the requirements expected of it. This allows it to be placed in position or removed at an instant's notice. The use of the device is greatly advantageous to those who use it for the work in question, as it saves time, reduces waste of material, requires less effort and eliminates a considerable amount of the cost involved by other conventional practices in this class of work. The indexing means at 27 enables adjustment to be made and visually observed between the pivot pin 20 and the miller or cutting tool 15.

Figure 1:
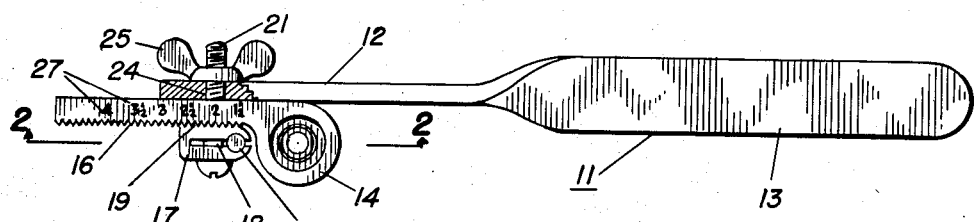
Figure 1 is a plan view of hole cutting device embodying this invention.
Figure 2:
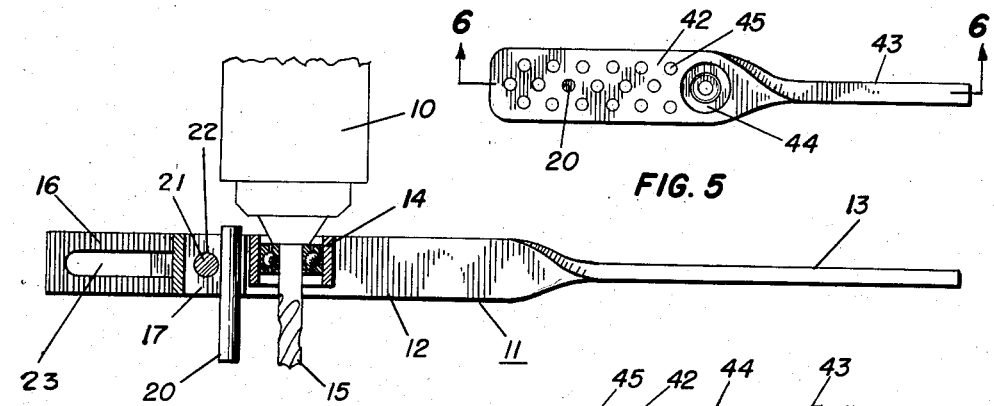
Figure 2 is a section of the device taken on line 2—2 of Figure 1.

In Figure 5, is shown a modified arrangement for positioning the pivot pin at various distances from the milling tool without using bolts, nuts and center pin holders of the clamping type to change the center distances between the pivot pin and milling tool centers. In the modified form the bar 42 is provided with a series of center holes 45 that receive the pin 20 frictionally tight. A handle 43 is provided to manipulate the milling cutter 15 as described above. The handle 13 shown in Figures 1 and 2 can be swung on the bolt 21 from right to left when the wing nut 25 is loosened so the hole or slot may be cut with either hand.

While but two general forms of the invention is shown in the drawings and described in the specification, it is not desired to limit this application for patent to these particular forms as it is appreciated that other forms of construction could be made that would use the same principles and come within the scope of the appended claims.

Having thus described the invention what is claimed is:

1. A portable cutting tool comprising a handle having a portion at one end adapted to be grasped by the user to manipulate the tool, a member in juxtaposition to the handle, means for adjustably securing said member to the opposite end of the handle, said means comprising a pin holder contacting the member and having an open-ended elongated slot therein, a centering pin held in the slot of the pin holder, a screw extending through the pin holder, member and handle, a nut on said screw to tighten the parts together, a bearing carried by the aforesaid member between the pin and the manipulating end of the handle, and a cutting tool carried by the handle and guided by said bearing, whereby said bearing and tool are adjustable along the handle and secured in place by said adjustable securing means.

2. A portable tool as set forth in claim 1 comprising serrations between the pin holder and the member, said slot in the pin holder allowing for selectively adjusting the position of the pin therein.

References Cited in the file of this patent

UNITED STATES PATENTS

| Number | Name | Date |
|---|---|---|
| 860,020 | Dearholt | July 16, 1907 |
| 1,100,666 | Bass | June 16, 1914 |
| 1,138,767 | McCormack | May 11, 1915 |
| 1,966,962 | Horkorouny | July 17, 1934 |
| 2,238,304 | Belanger | Apr. 15, 1941 |